May 31, 1960　　　　R. T. BURNETT　　　　2,938,609
AUTOMATIC ADJUSTOR FOR BRAKES
Filed Sept. 9, 1954

INVENTOR.
RICHARD T. BURNETT
BY John A. Young
ATTORNEY

United States Patent Office 2,938,609
Patented May 31, 1960

2,938,609
AUTOMATIC ADJUSTOR FOR BRAKES

Richard T. Burnett, South Bend, Ind., assignor to Bendix Aviation Corporation, South Bend, Ind., a corporation of Delaware Filed Sept. 9, 1954, Ser. No. 455,051

4 Claims. (Cl. 188—73)

This invention relates generally to an automatic adjustor and more specifically, to a piston-stroke-controlling device for use in a fluid motor.

The adjustment of axially-applied friction elements, as for example disk brake elements, involves successively spreading the elements apart to compensate for lining wear. Though the width of the lining is worn incidentally to brake usage, it is thus possible to maintain the same clearance between the friction surface and that portion of the brake with which it is engageable.

There are a number of deficiencies in adjusting devices with which I am acquainted. These deficiencies involve; complexity of construction, tendency to "over" adjust, and prohibitive cost.

The present invention proposes for its objects: (1) varying the retraction of friction elements as a function of wear thereof and, (2) accomplishing this adjustment without the use of structure other than that already regarded as essential to the brake; (3) eliminating drag i.e. development of torque while the brake is released; (4) supplying refined degrees of adjustment which do not result in "over" adjustment of the brake.

Figure 1:
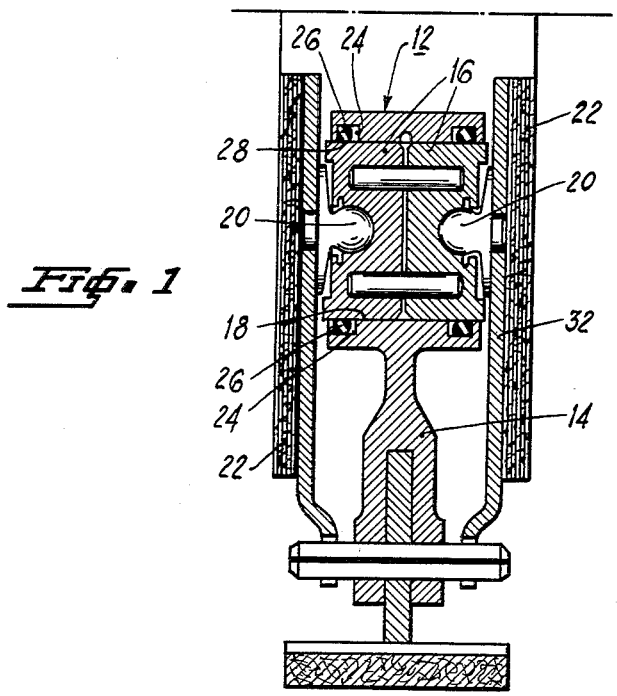
Figure 2:
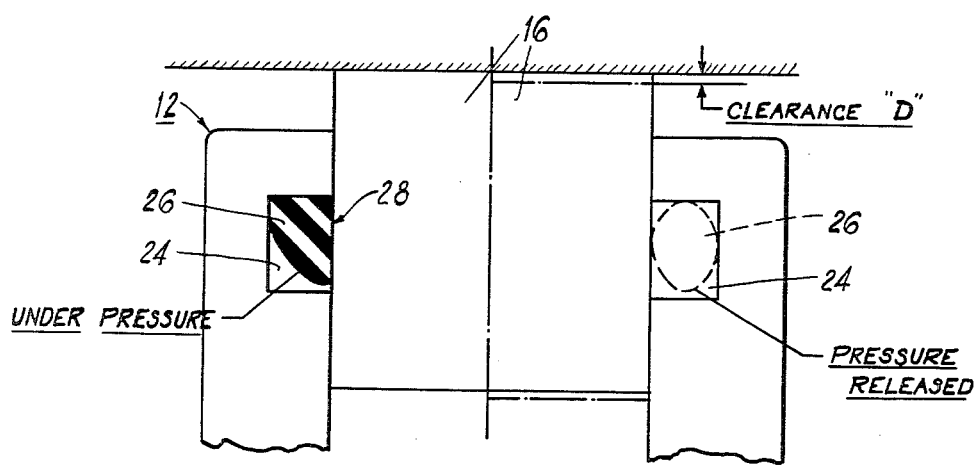

These objects and others will become more apparent from a consideration of the following description which proceeds with reference to the accompanying drawings in which:

Figure 1 is a section view of a fluid motor and brake elements actuated thereby; and Figure 2 is a schematic illustration of an adjusting operation. The left hand side of Figure 2 shows the piston in extended position, and the right hand side of Figure 2 shows the piston in released position.

Referring to Figure 1, a fluid motor 12 which is carried by brake unit 14 has a pair of pistons 16 slidably received in cylinder bore 18. The pistons are connected through ball-joints 20 to "disk" friction elements 22.

An annular groove 24 is formed in cylinder bore 18 adjacent either of the opposite ends thereof. O-ring seals 26 are positioned in grooves 24 for exerting a slight retracting force on the pistons 16.

The inside diameter of the O-ring seal is slightly less than the bore diameter. The pistons compress the inner edge of the O-ring seal thus making a flat annular sealing surface 28 between each piston 16 and its accompanying seal 26. The sealing surface varies somewhat during brake release and brake application as will be apparent from a comparison of sealing surfaces on the right and left hand of Figure 2. The O-ring seal 26 grips the outer periphery of the piston 16 and is capable of movement with the piston 16, which movement is limited by abutment of the seal with opposite sides of the groove 24.

In operation, fluid pressure is introduced to the fluid motor 12 in brake unit 14, spreading the "disk" elements 22 apart, engaging them with axially spaced sides of a rotor (not shown).

When the operator releases applying effort, hydraulic pressure in the fluid motor is diminished sufficiently to permit retraction of the "disk" elements 32 from the sides of the rotor. The retraction of the "disk" elements is sufficient to substantially eliminate any drag on the rotor which is not produced by the operator's applying effort. This retracting of the piston is accomplished by means of the resiliency of the O-ring seal 26.

Referring to Figure 2, the left hand portion illustrates the condition of the seal when fluid pressure has been developed in the cylinder bore 18 to apply the "disk" elements 22. The piston 16 is now in extended position. It will be noted that the O-ring seal 26 is deformed against a side of the groove 24 which serves as an abutment limiting further movement of the seal with the piston. The piston travel however, is limited only by contact of the "disk" elements with a side of the rotor.

A certain amount of the energy which produces movement of the piston 16 goes into deforming the resilient O-ring seal 26 so that it assumes the shape illustrated on the left hand side of Figure 2. When the fluid pressure is released, the resilient seal 26 tends to resume its original shape, depicted on the right hand side of Figure 2. The seal 26 grips the outer periphery of the piston 16, and as the seal expands away from the side of the groove 24 it pulls on the piston 16 retracting it through the distance "D." This distance of retraction "D" is sufficient to substantially eliminate drag of the disk element 22 on the engaging side of the rotor.

During retractive movement of the piston 16, there is no relative motion between the seal 26 and the piston 16; thus, the elasticity of the deformed seal 26 is utilized to pull the disk element 22 away from engagement with the rotor. In this way it is possible to substantially eliminate drag of the brake without the addition of any components other than those heretofore regarded as absolute essentials in the brake.

The described function of the O-ring seal 26 as a return means, makes it possible to maintain constant clearance of the disk element 22 from an applied position irrespective of the extent of wear of the lining on the disk element 22. The piston may be moved sufficiently to cause complete application of the lining against the side of the rotor, but when the pressure is released, the seal 26 will always return the piston 16 the same amount irrespective of the travel of the piston 16 on its extending stroke. This is an important consideration because it is the distance the "disk" element moves in being applied that determines the pedal travel required by the operator to fully apply the brake.

By means of the described piston-seal-cylinder construction, pedal travel will not be adversely affected by wear of the lining on the disk elements; and yet, drag of the disk elements on the rotor has been substantially eliminated without foregoing the advantages of free floating pistons.

If the seal-adjustor should position the "disk" elements responsively to an overheated rotor, then rotor contraction forces the sides thereof to re-engage the lining with a sufficiently great effort to retract the "disk" elements against the resistance of the O-ring seals; thus "over" adjustment is compensated for by pushing of the sides of the rotor against the friction surface of the "disk" element.

Although this invention has been described in connection with a specific embodiment, the principles involved are susceptible of numerous other applications which will occur readily to those persons skilled in the art. I intend to include within the scope of the following claims all equivalent applications of the principles of the invention by which substantially the same results of the invention may be obtained.

I claim:

1. In a fluid motor, a cylinder, two oppositely-acting laterally applied disk elements, a pair of oppositely-acting pistons slidably received in said cylinder and operatively connected to said disk elements to provide both protractile and retractile force thereon, a resilient member confined within each of two spaced grooves of the cylinder, each of said grooves having a shoulder against which its sealing member is compressed, each said piston being proportioned to provide fluid access to the resilient member which seals the surrounded piston surface engaged by said cylinder member, and a gripping connection between each seal and its opposed piston surface to effect retraction of the piston and friction member connected therewith as the seal returns to its undeformed state when the pressure in said cylinder is relieved.

2. In a fluid motor actuator for laterally applied disk friction elements, a cylinder, an annular groove formed in the wall of said cylinder adjacent each of the opposite ends thereof, a resilient member confined within each of the grooves formed in the cylinder and proportioned of such size that a portion thereof protrudes within the space surrounded by said cylinder bore, a shoulder within said groove against which the resilient member is compressed, two pistons received within said cylinder bore and proportioned to be of slightly less diameter than said cylinder bore to provide access of fluid pressure to each of said resilient members which are compressed against the shoulder as the fluid motor is energized, means operatively connecting each of said pistons to a respective one of said friction members, and a gripping connection between each of said resilient members and its respective piston by which the resilient member provides a retractile force on the piston and its connected friction member when the resilient member returns to its undeformed condition as the fluid pressure is relieved.

3. For use in combination with a pair of oppositely-acting friction elements, a cylinder having a cylinder bore formed therein, a pair of oppositely-acting pistons each having an operative connection with a respective one of said friction elements to move the friction element in each of opposite directions, two resilient sealing members confined individually within each of two grooves located adjacent the open ends of said cylinder bore, each of said grooves having a shoulder against which the sealing member is compressed, each said resilient member being proportioned to extend within the space surrounded by said cylinder bore, said pistons being proportioned to provide fluid access between the piston and its opposed bearing surface of said cylinder bore to act against the resilient member which provides a fluid barrier by deformation against its coacting shoulder, and a gripping connection between each said resilient member and piston providing retractive force on the piston and its interconnected friction member as the seal returns to its undeformed state when the pressure in said cylinder is relieved.

4. In a fluid motor actuator for a laterally applied disk friction element, a cylinder, an annular groove formed in the wall of said cylinder adjacent the open end thereof, a resilient member confined within said groove formed in the cylinder and proportioned of such size that a portion thereof protrudes within the space surrounded by said cylinder bore, a shoulder within said groove against which the resilient member is compressed, a piston received within said cylinder bore and proportioned to be of slightly less diameter than said cylinder bore to provide access of fluid pressure to said resilient member which is compressed against the shoulder as the fluid motor is energized, means operatively connecting said piston to said friction member, and a gripping connection between said resilient member and said piston by which the resilient member provides a retractile force on the piston and its connected friction member when the resilient member returns to its undeformed condition as the fluid pressure is relieved.

References Cited in the file of this patent

UNITED STATES PATENTS

| | | |
|---|---|---|
| 2,120,922 | Rasmussen | June 14, 1938 |
| 2,174,400 | McCune | Sept. 26, 1939 |
| 2,208,620 | Baisch | July 23, 1940 |
| 2,336,352 | Goepfrich | Dec. 7, 1943 |
| 2,352,829 | Forbes | July 4, 1944 |
| 2,358,740 | Scott-Iversen | Sept. 19, 1944 |
| 2,371,554 | Scott-Iversen | Mar. 13, 1945 |
| 2,596,298 | Shreffler | May 13, 1952 |
| 2,598,609 | Samuel | May 27, 1952 |

FOREIGN PATENTS

| | | |
|---|---|---|
| 818,889 | Germany | Oct. 29, 1951 |